United States Patent [19]

Brausfeld

[11] Patent Number: 5,181,692
[45] Date of Patent: Jan. 26, 1993

[54] VALVE ASSEMBLY FOR PRESSURE FLUIDS

[75] Inventor: Walter Brausfeld, Hanover, Fed. Rep. of Germany

[73] Assignee: Mannesmann Akiengesellschaft, Dusseldorf, Fed. Rep. of Germany

[21] Appl. No.: 867,849

[22] Filed: Apr. 13, 1992

[30] Foreign Application Priority Data

Apr. 12, 1991 [DE] Fed. Rep. of Germany ....... 4112463

[51] Int. Cl.$^5$ .............................................. F16K 51/00
[52] U.S. Cl. ...................................... 251/367; 137/315
[58] Field of Search ......................... 137/315; 251/367

[56] References Cited

U.S. PATENT DOCUMENTS

| 4,298,020 | 11/1981 | Inada et al. | 251/367 |
| 4,316,480 | 2/1982 | Kah, Jr. | 251/367 |
| 4,431,163 | 2/1984 | Barbe | 251/367 |

FOREIGN PATENT DOCUMENTS 2852685 12/1978 Fed. Rep. of Germany .
3525857 2/1987 Fed. Rep. of Germany .

Primary Examiner—A. Michael Chambers
Attorney, Agent, or Firm—Cohen, Pontani, Lieberman, Pavane

[57] ABSTRACT

A valve assembly suitable for both high and low pressures, includes a base plate (1) a first connection surface (3) and a valve housing (2) which forms a corresponding facing second connection surface (4), a pressure-tight connection which is useful for a battery arrangement and does not consume space elsewhere required. The connection can be created and maintained by a yoke (9) which grips below the valve base plate (1) in a longitudinal direction (8), having arms (9a, 9b) which extend on narrow side surfaces (1a) of the base plate (1) and of coupled valve housing (2), on which arms detent projections (10), which engage into corresponding recesses (2a) of the valve housing (2), are provided. Ease of assembly and disassembly is provided by additional projections (11) which engage in detent troughs (12) on the base-plate side surfaces (1a). The additional projections (11), when the fluid in the valve is not under pressure, allow a disengagement of the detent projections (10) in the recesses (2a) of the valve housing (2) by the spreading of the arms (9a, 9b) so that the detent projections clear the recesses (2a).

12 Claims, 2 Drawing Sheets

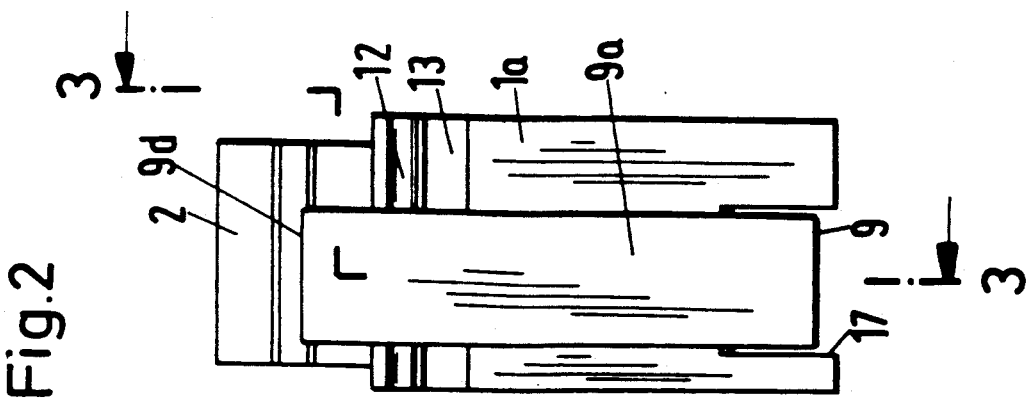
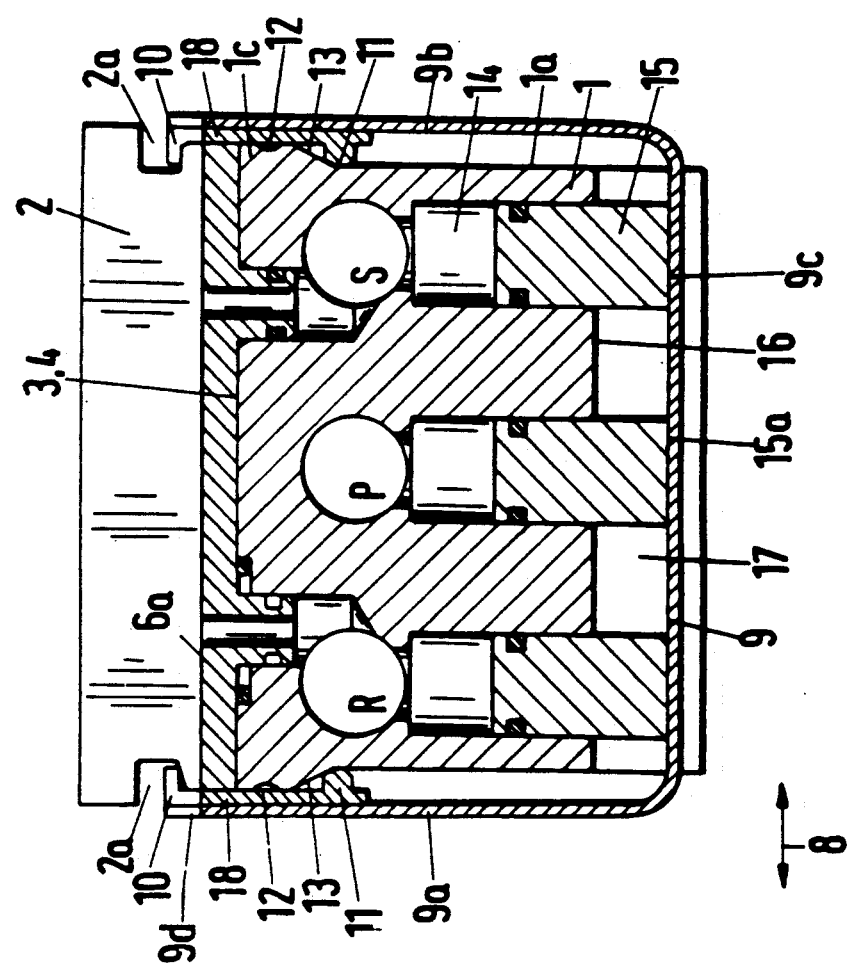

VALVE ASSEMBLY FOR PRESSURE FLUIDS

FIELD OF THE INVENTION

The present invention relates to a valve apparatus for pressurized fluids which includes a base plate and a valve housing. The base plate has first connection ports for operating, pressure, venting and control lines or the like, which open into a first connection surface. The valve housing forms a corresponding second connection surface, facing the first connection surface, having connection sockets or second connection openings provided with appropriate sealing devices. The sockets or openings of the second connection surface are sealingly engaged to the first connection surface openings by insertion therein or proximity thereto, as the case may be.

BACKGROUND OF THE INVENTION

Generally, known valve housings of the above type are bolted to a support. Such an arrangement, however, means that the fluid connections for pressurized fluids, vent lines and the like are fastened directly to the valve housing. Because of these connections, the valve housing can be replaced only with great difficulty, and the expenditure of time required for this and the corresponding interruption in operation are disadvantageous. In order to eliminate this disadvantage of known systems, a division was created between a so-called base plate and a separate valve housing, the two being bolted together to form the valve assembly. The connecting lines are in this case present only on the base plate and do not have to be removed if the valve housing is to be replaced. The mounting and removal of the valve housing of this system, however, still require tools and a certain amount of time, which may result in operating disadvantages depending on the use of the valve. It is of considerable importance to avoid lengthy shutdowns in operation due to the replacement of a valve housing with all the consequences of the resulting reduction in productivity.

Federal Republic of Germany Laid-open Patent Document OS 35 25 857, relates to a valve which addresses this problem. The solution proposed by that reference is limited to attaching the valve housing to the base plate by means of long, continuous bolts, which present the aforementioned disadvantages during the replacement operation, which requires both a significant amount of time and the appropriate tools. Thus, DE OS 35 25 857 does not address the present problem and sets forth an apparatus having features which are specifically to be avoided.

Federal Republic of Germany Patent 28 52 685, concerns a device with base plates adapted for connection as a battery of valves, whose purpose is to eliminate the need for tools and to connect several base plates together by means of snap connections. In this case, hook-shaped projections formed of a resilient material are provided on the base plates which engage in recesses in adjacent base plates, wherein a projection is provided on the first end of each base plate and a recess provided on the second end of each base plate, together forming a snap attachment for two adjacent base plates. Such base plate connections are suitable for rapid mounting, but are less suitable for rapid disassembly since, in general, such base-plate valve batteries need rarely be disassembled, and thus ease of disassembly is not a major design criteria.

SUMMARY AND OBJECTS OF THE INVENTION

It is an object of the present invention to provide a valve assembly for pressurized fluids, with ease of assembly and disassembly, without need for specialized tools.

It is a further object of the present invention to provide a valve assembly including elements for preventing accidental disassembly while the apparatus is operating under pressure.

Further objects, features and advantages of the present invention will become apparent to persons skilled in the art from the detailed description of the preferred embodiments which follows, when considered together with the attached drawing figures.

The valve assembly of the present invention includes a base plate having connection openings for operating, pressure, vent and control lines or the like debouching, i.e. opening, on a first connection surface and of a valve housing, the base plate forming the first connection surface and the valve housing forming a corresponding second connection surface facing the first surface. Connection sockets or corresponding connection openings provided with sealing elements are provided on the second valve housing connection surface, the sockets or openings being adapted to be introduced in sealing manner into the connection openings of the base plate or to be placed in sealing manner against them. The assembly is held together with a yoke which grips below the base plate in a longitudinal direction and has arms extending on narrow side surfaces of the base plate and of the valve housing. These arms are provided with detent projections which engage corresponding recesses in the valve housing. The yoke can be shifted, by applying pressure toward the valve housing, for disengaging the yoke, provided the fluid contained in the valve is not under pressure. The engaged position of the yoke is an operating position pressing the base plate and the valve housing together against each other, while the disengaged position is an unlocked position in which the arms are held apart by additional projections into detent troughs on the base-plate side surfaces. These additional projections thus effect, when spreading the arms, a disengagement of the detent projections in the recesses of the valve housing. This system provides a tightly sealed connection, which may be effected without the use of special tools, between a valve housing and base plate which are to be placed together. This yoke can easily be inserted by hand and assuring a tight connection with low pressures, even if a number of valves are arranged in a battery of valves. In particular, correct mounting of the sealing seats is possible. The fastening system of the present invention does not take up space required elsewhere or by other valve elements, and can be produced economically. The valve arrangement according to the present invention permits not only a fastening of the valve without tools but also assembly and disassembly in a minimum amount of time. Further, the coupling parts are placed on sides of the valve which are easily accessible.

The present invention, in a preferred embodiment, provides detent troughs for the additional projections which are arranged on protruding side-surface sections of the base plate. With such a structure, simply pressing the yoke toward the base plate is sufficient to effect a spreading of the arms and thus disassembly of the valve housing from the base plate. A further embodiment provides a valve assembly in which the protruding side-surface sections of the base plate pass via a descending wedge-shape path into the side surfaces of the base plate. In this way, the forming of the detent troughs can be included in the manufacture of the base plate, without additional processes.

In order to prevent disassembly of the valve while the apparatus is under pressure, the present invention provides a valve in which at least one of the connection openings of the base plate, is provided with a piston which is guided in sealed manner in an attached cylinder space and, upon being acted on by pressure, lies with an outer end surface thereof against the yoke, which grips below the base plate, when the detent projections engage into the recesses of the valve housing or when the additional projections have been brought out of engagement. A pressing together of valve housing and base plate can take place advantageously as a function of the pressure. Higher pressures thus result in a higher seal.

The present invention also provides a valve assembly in which the base plate has a bottom surface, facing away from the valve housing, provided with a continuous recess which corresponds to the inside width of the yoke engaging below the base plate. In this way, the yoke is located at an extremely small distance from the parts to be connected and fits into the basic shape of the structural unit.

The yoke may be formed as a single piece. The yoke can, for example, consist of stainless spring steel or other resilient material. Of course, other constructions are possible. The section of the yoke which engages below the base plate and the two arms of the yoke may be formed to have a U-shape, i.e. having a central portion and two members projecting generally perpendicularly to the central portion for approximately the same distance, and that plate bodies provided in each case with the detent projections, the spaced additional detent projections being fastened on the ends of the arms.

BRIEF DESCRIPTION OF THE DRAWING

The preferred embodiments are shown by way of example in the accompanying drawing in which:

FIG. 1 is a vertical section through the base plate and valve housing, connected under the action of pressure;

FIG. 2 is a side view of FIG. 1; and

DETAILED DESCRIPTION OF THE PREFERRED EMBODIMENTS

Figure 3:
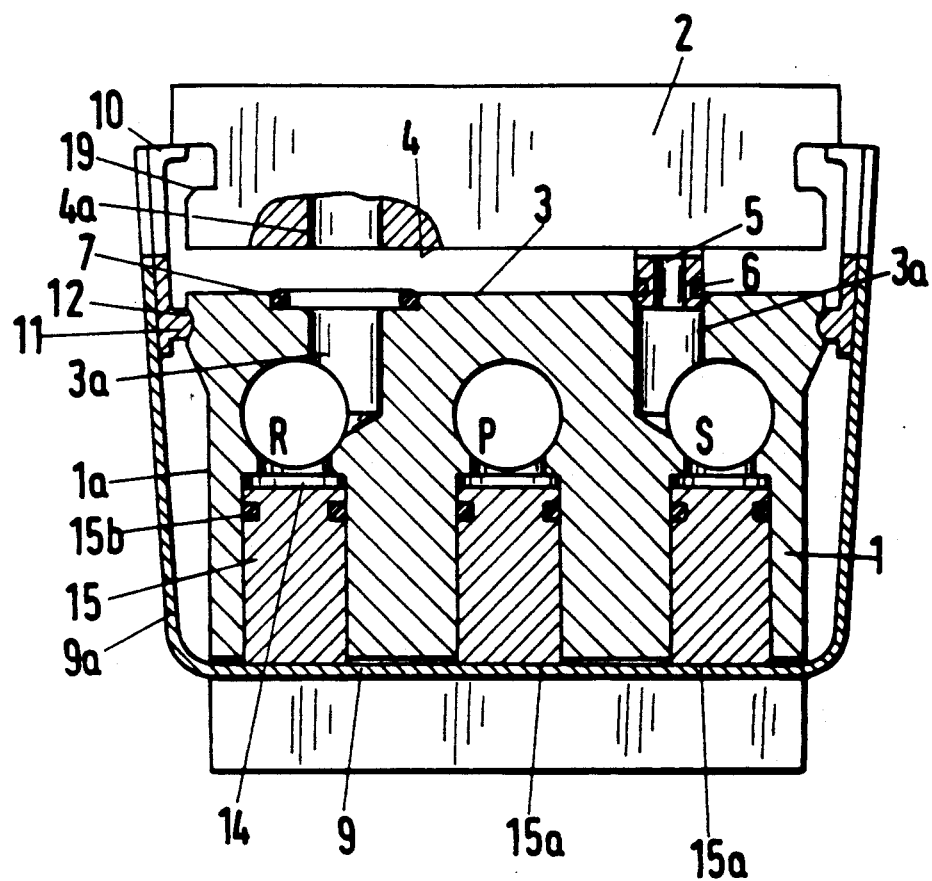
FIG. 3 is a vertical partial section along line 3—3 of FIG. 2, through the left half of the connection, in an open position prior to being brought together.

The valve assembly of the present invention, for modulating a flow of pneumatic or hydraulic pressure fluid, consists of a base plate 1 and a valve housing 2 which are to be attached together to form the inventive valve assembly. The base plate 1 is provided on a first connection surface 3, as shown in FIG. 3, with connection openings 3a for operating, pressure, vent and control lines P, R, S. The valve housing 2 forms a second connection surface 4, on which connection sockets 5 with sealing rings 6 are arranged. Furthermore, connection openings 4a with sealing rings 7 are present on the second connection surface 4.

It is also possible, as shown in FIG. 1, to provide flat seals 6a, as indicated by dot-dash lines, instead of the connection sockets 5 with sealing rings 6.

In FIG. 1, the valve housing 2 is shown attached to the base plate 1. The connection is formed by yoke 9 which grips below the base plate 1 in a longitudinal direction 8, having arms 9a and 9b which extend over narrow side surfaces 1a of the base plate 1 and the valve housing 2. These arms 9a and 9b engage corresponding recesses 2a in the valve housing 2 by means of detent projections 10. As shown in FIG. 3, the yoke 9 can be lifted into an unlocked position in which, with coordinated spacing, additional projections 11 engage detent troughs 12 which are arranged on the side surfaces 1a. This position is achieved by displacing the yoke 9 toward the valve housing 2, thereby causing the detent projections 10 to be laterally displaced outwardly in the direction 8, to clear the corresponding recesses 2a in the valve housing 2, so that the valve housing 2 may be separated from the base plate 1. A further embodiment, described below, prevents disassembly of the valve when the fluid contained in the valve is under pressure. The additional projections 11 produce, in their detent position, shown in FIG. 3, an unlocking of the detent projections 10 from the recesses 2a by the spreading of the arms 9a and 9b. The detent troughs 12 for the additional projections 11 are present on protruding side-surface sections 1c of the base plate 1. In this connection, the protruding side-surface sections 1c of the base plate 1 pass via a course 13 which descends in wedge-shaped manner into the side surfaces 1a of the baed plate 1. In other words, the contour of the base plate 1 from the side surfaces 1a to the side-surface sections 1c are tapered so that the additional projections 11 may slide on an inclined surface against the base plate 1 between a locked position, and an unlocked position in which the detent troughs 12 which are arranged on the side surfaces 1a.

For higher pressures, a preferred embodiment of the present invention includes, as shown in FIGS. 1 and 3, a cylinder space 14 in fluid communication with at least one of the connection openings 3a and for operating, pressure, vent and control lines P, R, S respectively. A piston 15 is provided in the cylinder space 14, which is sealingly guided with packing rings 15b and which, when acted on by pressure from the connection openings 3a, the end surface 15a of the piston 15 presses against the yoke 9 which grips below the base plate 1, thus supplying an opposing force to any force applied to the yoke 9 toward the valve housing 2, which would tend to disengage the base plate 1 from the valve housing 2. In this way, the arms 9a, 9b of the yoke 9 and the detent projections 10 of the arms are pressed into the recesses 2a. In such a case, the pressing force is a function of the pressure of the fluid, and therefore, increased pressures tend to seat the valve housing 2 and the base plate 1 and therefore enhance the seal between them.

It is also possible, under pressure conditions which are assured and dependable during operation, to use, instead of the piston 15 acted on by pressure fluid, with or without connection to the operating, pressure, vent or control lines P, R, S, etc., a compression spring with a sealed pressure plate for a fluid connection to provide a locking function in the presence of pressurized fluid. In the absence of a fluid connection, a suitably prestressed compression spring of predetermined spring characteristic (spring constant) is provided, which is chosen based on the sealing force between base plate 1 and valve housing 2. In this interlocked position, the projections 11 are not engaged with the detent troughs 12. Other known methods for locking the yoke 9 while the valve is operating may also be used.

The base plate 1 is preferably provided with a continuous recess 17 on its bottom surface 16, facing away from the valve housing 2. The yoke 9 extends freely through this recess 17. The yoke 9 is preferably made of resilient stainless steel. The yoke 9 can further have the section 9c thereof which grips below the base plate 1 and its two arms 9a, 9b formed as a U-shape, and the detent projections 10 and the spaced additional projections 11 at the ends 9d of the yoke 9 formed as part of an attached plate body 18. The distance from the detent projection 10 to the additional projections 11 results from the distance of the recess 2a from the detent trough 12 or from the wedge-shaped course 13 into the side surfaces 1a.

The detent projection 10 can advantageously be provided in each case with an undercut detent surface 19 which is alos located in the recess 2a, so that, when the arms 9a and 9b swing inward, a pushing force in the direction of a connecting movement of the base plate 1 and the valve housing 2 occurs.

The present invention claims priority from German Patent Application No. P 41 12 463.4, filed Apr. 12, 1991, the entirety of which is expressly incorporated herein by reference. An English language translation of said German Patent Application No. P 41 12 463.4 is attached hereto as Appendix and forms part of this disclosure.

It should be understood that the preferred embodiments and examples described are for illustrative purposes only and are not be construed as limiting the scope of the present invention which is properly delineated only in the appended claims.

What is claimed is:

1. A pressure fluid valve assembly, comprising,
    a base plate having a first connection surface, first fluid connection openings debouching on said first connection surface, and a pair of opposite side surfaces having detent troughs (12);
    a valve housing having a second connection surface, opposite to said first connection surface, a pair of opposite side surfaces having recesses (2a), said second connection surface having second fluid connection openings, and connection means for sealingly connecting said first fluid connection openings and said second fluid connection openings;
    a yoke (9) extending in a longitudinal direction (8) below said base plate (1), said yoke having arms (9a, 9b) extending on said side surfaces (1a) of said base plate (1) and said valve housing (2), each of said arms (9a, 9b) having a first detent projection (10) at a distal portion thereof for engagement with said recesses (2a) in said valve housing (2) and a second detent projection (11) at a proximal portion thereof for engagement with said detent troughs (12);
    said yoke being movable with respect to said base plate (1) along an axis parallel to said side surfaces of said base plate between a locked position in which said first detent projections (10) engage said recesses (2a), urging said base plate (1) and said valve housing (2) together, and an unlocked position in which said second detent projections (11) engage said detent troughs (12) thereby separating said arms (9a, 9b) so that said first detent projections (10) do not engage said recesses (2a), relieving a force between said base plate (1) and said valve housing (2); and
    means for releasably locking said valve housing (2) to said base plate (1) based on a pressure condition in at least one of said first fluid connection openings.

2. The apparatus according to claim 1 wherein said locking means comprises maintaining means for maintaining said locked position when at least one of said first fluid connection openings is subject to a pressure condition, and allowing said yoke to be moved to said unlocked position when said at least one of said first fluid connection openings is not subject to a pressure condition.

3. The valve assembly according to claim 2, wherein said maintaining means comprises, in communication with at least one of said first connection openings (3a) of the base plate (1), a cylinder (14) having a piston (15) with an outer surface (15a) displaceable therewithin toward said yoke by a pressurized fluid from said at least one of said first connection openings, so that said outer end surface (15a) rests against said yoke (9) when said detent projections (10) engage said recesses (2a) or when said second projections (11) are disengaged from said detent troughs.

4. The valve assembly according to claim 3, wherein said protruding portions of said side surface (1c) of said base plate (1) include a wedge-shaped surface which tapers (13) inwardly from a portion proximal to said first connection surface toward said side surfaces distal from said first connection surface.

5. The valve assembly according to claim 1, wherein said connection means comprises a coupling selected from the group consisting of connection sockets, being insertable into said first fluid connection openings to provide a sealed connection and connection apertures corresponding to said first fluid connection openings having associated sealing means for forming sealed connections when urged together.

6. The valve assembly according to claim 1, wherein said detent troughs (12) are arranged on protruding portions of said side surfaces (1c) of said base plate (1).

7. The valve assembly according to claim 6, wherein said protruding portions of said side surface (1c) of said base plate (1) include a wedge-shaped surface which tapers (13) inwardly from a portion proximal to said first connection surface toward said side surfaces distal from said first connection surface.

8. The valve assembly according to claim 1, wherein said base plate (1) comprises a bottom surface facing away from the valve housing (2), said bottom surface (16) having a continuous recess (17) which corresponds to a width of said yoke (9) engaging below said base plate.

9. The valve assembly according to claim 1, wherein said yoke (9) is fabricated as a single piece.

10. The valve assembly according to claim 1, wherein said yoke (9) comprises a central section (9c) which engages below the base plate (1) and said arms (9a, 9b), each having an end (9d), said central section and said arms forming a "U"-shape, said first detent projections and said second detent projections being formed on a pair of plate bodies (18) fastened to said ends (9d) of said arms (9a, 9b).

11. A pressure fluid valve assembly, comprising,
    a base plate having a first connection surface, first fluid connection openings debouching on said first connection surface, a bottom surface facing away from said first connection surface having a continuous recess (17), and a pair of opposite side surfaces having detent troughs (12) arranged on protruding portions of said side surfaces (1c) of said base plate (1), said protruding portions having a wedge-shaped surface which tapers (13) inwardly from a locus proximal to said first connection surface toward said side surfaces distal from said first connection surface;

a valve housing having a second connection surface opposite to said first connection surface, a pair of opposite side surfaces having recesses (2a), said second connection surface having second fluid connection openings, and a coupling selected from the group consisting of connection sockets, being insertable into said first fluid connection openings to provide a sealed connection and connection apertures corresponding to said first fluid connection openings having associated sealing means for forming sealed connection when urged together;

a yoke (9) which grips in a longitudinal direction (8) below said base plate (1), having arms (9a, 9b) extending on said side surfaces (1a) of said base plate (1) and said valve housing (2), said arms (9a, 9b) having ends and first detent projections (10) at a distal portion thereof, corresponding to said recesses (2a) in said valve housing (2) and second detent projections (11) at a proximal portion thereof, corresponding to said detent troughs (12), said first detent projections and said second detent projections being formed on plate bodies (18) fastened to said ends (9d) of said arms (9a, 9b), said yoke (9) having a central region engaging below said base plate (1) having a width corresponding to said continuous recess (17), said arms (9a, 9b) and said central region being fabricated as a single piece having a "U"-shape;

said yoke being movable with respect to said base plate (1) along an axis parallel to said side surfaces of said base plate between a locked position in which said first detent projections (10) engage said recesses (2a), urging said base plate (1) and said valve housing (2) together, and an unlocked position in which said second detent projections (11) engage said detent troughs (12) thereby separating said arms (9a, 9b) so that said first detent projections (10) do not engage said recesses (2a), relieving a force between said base plate (1) and said valve housing (2); and means for maintaining said locked position when at least one of said first fluid connection openings is subject to a pressure condition, and allowing said yoke to be moved to said unlocked position when said at least one of said first fluid connection openings is not subject to a pressure condition, comprising, in communication with at least one of said first connection openings (3a) of the base plate (1), a cylinder (14) having piston (15) with an outer surface (15a) displaceable therewithin toward said yoke by a pressurized fluid from said at least one of said first connection openings, so that said outer end surface (15a) rests against said yoke (9) when said detent projections (10) engage said recesses (2a) or when said second projections (11) are disengaged from said detent troughs.

12. A pressure fluid valve assembly, comprising, a base plate having a first connection surface, first fluid connection openings debouching on said first connection surface, and a pair of opposite side surfaces having detent troughs (12);

a valve housing having a second connection surface, opposite to said first connection surface, a pair of opposite side surfaces having recesses (2a), said second connection surface having second fluid connection openings, and connection means for providing a sealed connection between said first fluid connection openings and said second fluid connection openings;

a yoke (9) which grips in a longitudinal direction (8) below said base plate (1), having arms (9a, 9b) extending on said side surfaces (1a) of said base plate (1) and said valve housing (2), each of said arms (9a, 9b) having first detent projections (10) at a distal portion thereof, which correspond to said recesses (2a) in said valve housing (2) and second detent projections (11) at a proximal portion thereof which correspond to said detent troughs (12), said detent troughs (12) being arranged on protruding portions of said side surfaces (1c) of said base plate (1), said protruding portions having a wedge-shaped surface which tapers (13) inwardly from a portion proximal to said first connection surface toward said side surfaces distal from said first connection surface; and said yoke being movable with respect to said base plate (1) along an axis parallel to said side surfaces of said base plate between a locked position in which said first detent projections (10) engage said recesses (2a), urging said base plate (1) and said valve housing (2) together, and an unlocked position in which said second detent projections (11) engage said detent troughs (12) thereby separating said arms (9a, 9b) so that said first detent projections (10) do not engage said recesses (2a), relieving a force between said base plate (1) and said valve housing (2).

* * * * *